April 29, 1958 R. W. JONES 2,832,836
GROUP ALARM COMMUNICATION CIRCUIT
Filed Jan. 17, 1957
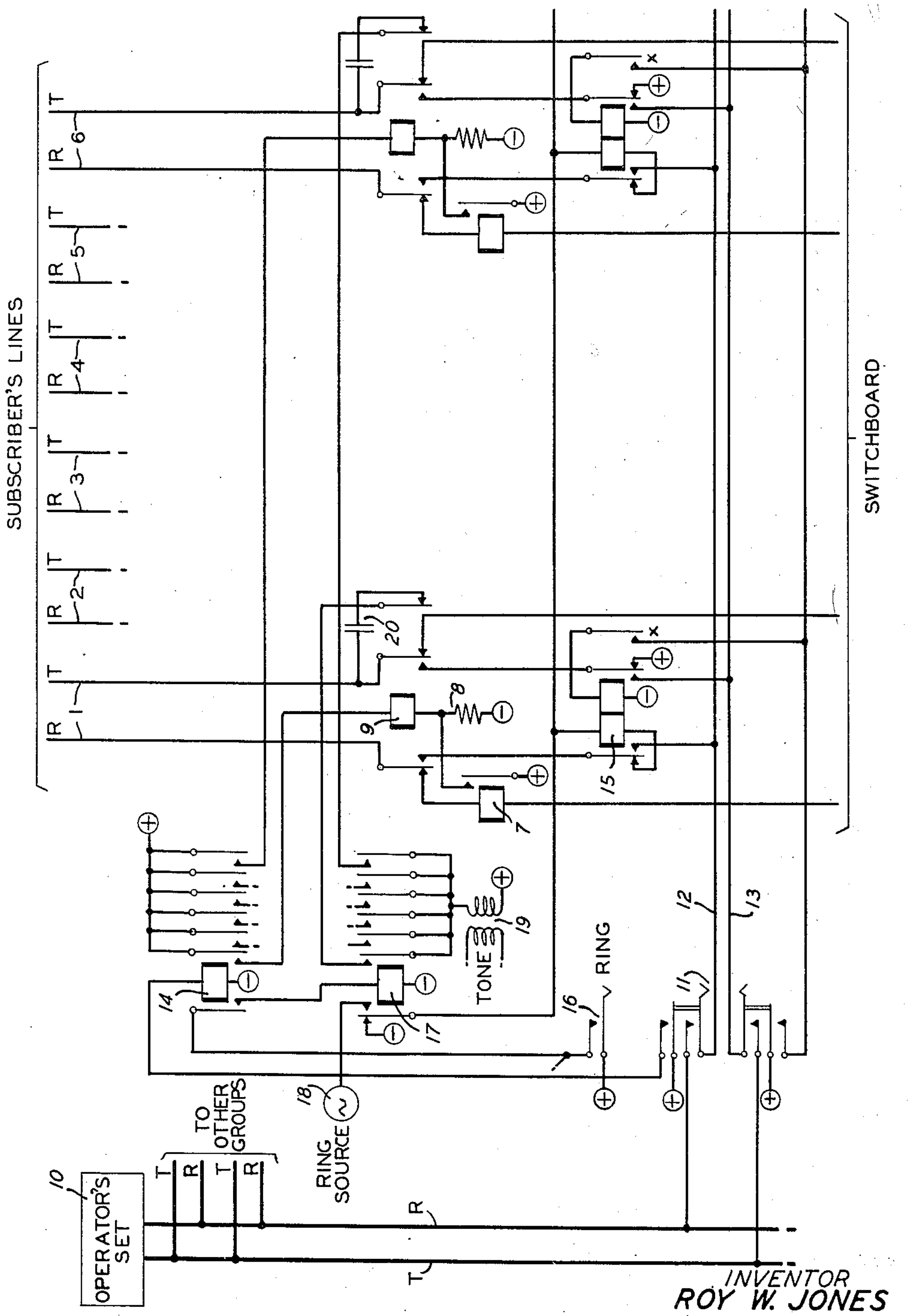
INVENTOR
ROY W. JONES
BY
*[signature]*
ATTORNEY 2,832,836
Patented Apr. 29, 1958

1

2,832,836

GROUP ALARM COMMUNICATION CIRCUIT

Roy W. Jones, Rochester, N. Y., assignor to General Dynamics Corporation, Rochester, N. Y., a corporation of Delaware Application January 17, 1957, Serial No. 634,651
4 Claims. (Cl. 179—51)

This invention relates to signalling systems and particularly to means in a telecommunication system for providing group alarm service, constituting an improvement over the system disclosed in an application of Joseph P. Weston, Serial Number 626,758, filed December 6, 1956.

The object of the invention is to provide means for locking a subscriber's line to a conference circuit, once the subscriber has responded to a summons, in the form of the ringing of his bell if he is idle or in the form of a tone superimposed on his line if he is busy.

The system consists of a group of lines such as telephone lines extending from individual subscribers' premises to a switchboard where such lines may be interconnected for conventional communication purposes. Each such line traverses a group alarm circuit much in the nature of a conference call circuit where, under control of an operator, all lines may be cut off from the switchboard and thereupon connected to a source of signalling current or to a common talking circuit.

The invention consists of a very simple set of individual relays for each line, a supervisory relay for maintaining a connection established prior to the group alarm call, a cut off relay for extending the line, when idle or when it temporarily becomes idle, to a common talking path and a ringing trip relay responsive to the answer of a subscriber after the operator has set up the group talking circuit. An operator's set is connected to one or more keys each leading to a small group of lines, which keys when operated will connect a common talking path to the operator and will operate the individual cut off relay of each line of the group if idle or set up a condition which will cause said cut off relay to immediately respond if a busy subscriber releases his line momentarily. A single master ringing key is provided for all the groups and will operate to cause either ringing current or a tone current to be transmitted to all the lines of a group under the control of an operated listening key. It is to be noted that the master ringing key is completely ineffective where no one of the listening keys is operated.

By means of the present invention the source of ringing current cannot be overloaded by connections made to busy lines either those established when the ringing key is operated or those which answer before or while the ringing key is operated.

A feature of the invention is the use of a supervisory relay which functions only to prevent the operation of the cut off relay when and if the circuit for operating such cut off relay is established. This supervisory relay does not control a slave relay as in prior art arrangements but merely acts to deter other relays which would affect the line circuit. Its function is to guard an established connection.

Another feature of the invention is a cut off relay which will immediately respond to the operation of a group listening key to prepare a signaling circuit to the subscriber's station but will be barred from operating by the said supervisory relay until the busy subscriber disconnects for a moment. The said cut off relay will prevent the reoperation of the supervisory relay.

2

Another feature of the invention is the use of a supervisory relay and a cut off relay in a mutual control circuit arrangement whereby one, operated, prevents the operation of the other. If the supervisory relay is operated first then the cut off relay cannot be operated but if the cut off relay is operated first, the supervisory relay cannot be operated.

Another feature of the invention is the use of two relays in a mutual control circuit constructed and arranged to lock into one of the two control conditions. It has been set forth hereinbefore that the operation of either the supervisory relay or the cut off relay will prevent the operation of the other. However, once the cut off relay gains control, such control cannot be recaptured by the supervisory relay, so it is not until the cut off relay can be released by the release of the conference connection that the supervisory relay can set up a bar to a later attempt to operate by the cut off relay.

Another feature of the invention is the provision for capturing each group line and holding it out of individual service indefinitely after the group listening key has been operated. As explained hereinbefore, after the operator has operated the group listening key, each line where the supervisory relay is inactive or which becomes released is captured through the operation of its cut off relay and cannot be returned to individual service thereafter during the conference period.

Another feature of the invention is an individual ringing trip or ringing cut off relay which will stand ready as soon as the individual cut off relay has been operated to signal the answer of the called subscriber. This relay, once operated, locks in its operated position under control of the group listening key. The called subscriber may leave the conference but cannot regain individual service so that if he comes back on to the line before the conference is terminated he will perforce be again added thereto.

Another feature of the invention is a means effective after the operator has operated his listening key and has thereby operated the individual cut off relays of all the idle lines for each subscriber to get into instant communication with the operator despite the fact that such operator has failed, neglected, or merely delayed the operation of his ringing key. Since the operation of the individual cut off relay immediately establishes a connection between the subscriber line and its individual ringing trip circuit, means is thereby provided to trip this relay as soon as the subscriber operates his set, whether the operator is ringing at that time or not. Thus the individual lines cannot be put out of service through neglect by the operator, for if he has operated his listening key a subscriber calling at that time will be connected to the common trunk instanter.

Other features will appear hereinafter.

The drawings consist of a single sheet containing a single figure, which is a schematic circuit diagram showing one group of subscribers' lines arranged for emergency group calling and indicating other similar groups.

The present invention resides in a system wherein a group of lines 1 to 6, or a plurality of such groups, are arranged for normal telephone service through a conventional switchboard. Each such line has arranged serially in the switchboard branch thereof a supervisory relay such as the relay 7 which, upon operation, places a ground connection in the circuit from battery, a resistor 8 and the winding of a cut off relay 9. Under normal operation this causes no operation, but it does ground one terminal of the cut off relay 9 so that if while the subscriber on line 1 is holding a conversation the operator sets up an emergency condition which grounds the other terminal of this cut off relay, it will not respond. As long as the subscriber on line 1 holds his supervisory relay 7 operated, he cannot be forced to abandon the connection.

It may be noted that the operator's set has connections extending to a plurality of groups such as the group of lines 1 to 6. In each case there is a listening key 11 for connecting the operator's set to the common talking conductors 12 and 13. The key 11 also causes the operation of the master cut off relay 14 which individually places a ground on each of the cut off relays such as 9. If the corresponding line is busy then the cut off relay will not operate but if the line is idle it will operate and extend the line to its individual ringing trip relay such as the relay 15.

Thereafter, the operator may operate the master ringing key 16 so that a ground will be forwarded through an armature and contact of the master cut off relay 14 to operate the master signal relay 17. This relay connects a source of ringing current 18 to the windings of all the individual ringing trip relays such as 15, which current is then connected to the front contact of the cut off relay 9. If this line had been idle when the key 11 was operated, then ringing current would be transmitted through the operated contacts of the cut off relay 9 to summon the subscriber on line 1. When the subscriber answers the ringing trip relay responds and by quickly operating its preliminary $x$ contact, closes a locking circuit under control of the listening key 11. If the subscriber answers after the operator has released the ringing key 16, the ringing trip relay will nevertheless operate from battery on the back contact of the master signal relay 17. If the subscriber on line 1 hangs up before the operator releases his key 11, relays 9 and 15 will remain operated and if the subscriber again comes on his line before this key is released he will again be added to the conference.

If, on the other hand, the subscriber on line 1 is busy and the master ringing key is operated while he is still busy, then an individual connection from a source of tone 19 is made through a back contact and armature of his cut off relay 9 and through a condenser 20 to his line whereby he may be notified that an emergency conference connection is being established. He may ignore this summons. However, the proper action for him to take is to hang up momentarily, thereby releasing his supervisory relay 7 and allowing the cut off relay 9 to operate. When he then comes back on the line the ringing trip relay 15 will operate either from the ringing current at the front contact of relay 17, or battery at the back contact thereof.

What is claimed is:

1. In a group alarm communication system, a plurality of individual subscriber lines extending into conventional line switching facilities, a supervising operator's position having means to establish an emergency communication trunk common to said lines, said means including a listening key, a master cut off relay operated by said listening key, each said line having a supervisory relay, a cut off relay and a ringing trip relay, in each said individual line circuit, a battery connection to said cut off relay, and means controlled by said supervisory relay for shunting said battery connection to prevent operation of said cut off relay, said master cut off relay having means to establish an individual operating circuit for each said individual cut off relay, a circuit for said individual ringing trip relay rendered effective by said associated cut off relay, a master signaling relay, a master ringing key at said operator's position, said master signaling relay supplying ringing current to said ringing trip relays in common, an individual tone circuit connection for each said individual line, a tone circuit controlled by each said cut off relay effective in the normal condition of said cut off relay, and a locking circuit for each said ringing trip relay controlled by said master listening key.

2. In a group alarm communication system, a plurality of individual subscriber lines extending into conventional line switching facilities, a supervisory operator's position having means to establish an emergency communication trunk common to said lines, said means including a listening key, a master cut off relay having means to establish an individual connection for each said line, each said line having an individual supervisory relay responsive to subscriber use of said line and an individual cut off relay responsive to the establishment of said individual connections by said master cut off relay and a mutually controlled circuit for said supervisory relay and said individual cut off relay whereby the first of said two relays to become operated will bar the operation of the second thereof.

3. In a group alarm communication system, a plurality of individual subscriber lines extending into conventional line switching facilities and for each of said lines a cut off relay for cutting off that portion of its said line extending into the said conventional switching facilities, a supervisory relay in series with said line in that portion of said line cut off by said cut off relay and a ringing trip relay connected to said subscriber line by the operation of said cut off relay, common means for operating said cut off relays and a means for supplying tripping current to said ringing trip relays, a common talking circuit and means controlled by said ringing trip relays for connecting said individual lines to said common talking circuit.

4. In a group alarm communication system, a plurality of groups each of a plurality of individual subscriber lines extending into conventional line switching facilities, a supervisory operator's position, an individual listening key for each said group for connecting a group common talking trunk to said operator's position a master cut off relay for each said group controlled by said individual listening key, a common ringing key, a master signalling relay for each said group under joint control of said common ringing key and its associated master cut off relay, each said line having an individual cut off relay, and an individual ringing trip relay, said individual cut off relay having means to transfer its associated line from said conventional line switching facilities to said associated ringing trip relay and said ringing trip relay being responsive to said associated line for transferring said individual line extended thereto to said group common talking trunk.

References Cited in the file of this patent

UNITED STATES PATENTS

| | | |
|---|---|---|
| 1,415,853 | Andrick | May 16, 1922 |
| 2,298,489 | Kiner | Oct. 13, 1942 |
| 2,374,357 | Kiner | Apr. 24, 1945 |